United States Patent Office 2,726,961
Patented Dec. 13, 1955

2,726,961

POLISHING WAX EMULSION AND METHOD OF PRODUCING IT

Ralph K. Iler, Wilmington, Del., assignor to E. I. du Pont de Nemours and Company, Wilmington, Del., a corporation of Delaware No Drawing. Application December 3, 1951,
Serial No. 259,689

2 Claims. (Cl. 106—10)

This invention relates to novel wax compositions and more particularly to compositions which comprise aqueous dispersions of a wax and colloidal silica.

This application is a continuation-in-part of my United States application Serial No. 775,375, filed September 20, 1947, for "Chemical Compositions" which has a continuation-in-part of my United States application Serial No. 699,087, filed September 24, 1946, for "Chemical Compositions."

Wax coatings are commonly applied to the surfaces of furniture, automobiles, and wood, asphalt tile, and linoleum floors for the purpose of imparting a pleasing, lustrous appearance and a protective film against dirt and moisture. Suspensions of such waxes as carnauba, montan, candelilla, beeswax and paraffin have been used for this purpose and have been applied in such forms as aqueous dispersions and solvent-containing pastes. Some of these compositions are of the "self-polishing" type, that is, they are applied as a suspension of wax in a carrier such as water and dry to a polished appearance without further rubbing.

Conventional wax compositions ordinarily include certain extenders or modifiers in the wax dispersions. These may comprise wax-soluble or water-dispersible natural or synthetic resins such as, for example, manila gum or polymeric alkyd-modified esters of rosin. These may be used in greater or lesser amount, depending upon the specific type of coating composition which is desired. The addition of such resin decreases the cost and often gives improved levelling or spreading properties to the wax dispersion.

Many wax polishes which have been proposed give coatings of pleasing appearance but which unfortunately are lacking in resistance to slipping. Such formulations, when applied to linoleum floors, for instance, give coatings which are not entirely safe to walk upon, in that leather shoe soles slide quite easily upon them. Similarly, rugs placed upon floors waxed with such materials slide readily when stepped upon and constantly are a hazard.

Efforts have been made to correct this lack of slip-resistance by including other materials, for example, ground feldspar, in the wax formulation. Such inclusions, however, often result in an impairment of the luster and pleasing appearance of the wax-coated surface.

Now according to the present invention it has been found that by including colloidal silica in aqueous wax dispersions novel compositions are produced. The silica improves the characteristics of the dispersions. In the case of compositions containing comparatively large amounts of wax as compared to modifiers, the silica will increase the slip-resistance of films produced using such dispersions. In compositions of the invention the silica has the further effect of increasing the hardness of the film, and it is further to be noted that wax dispersions containing comparatively small amounts of wax and comparatively large quantities of resins are improved as to their ability to produce coatings which are not objectionably tacky. The benefits obtained using silica are gained without objectionable impairment of the luster of films produced from wax dispersions.

The colloidal silica used according to the present invention is prepared according to processes described in an application of Joseph M. Rule, United States Serial No. 183,902, filed September 8, 1950, for "Chemical Processes and Compositions." In general, it may be noted of such compositions that the colloidal silica is added as a sol containing amorphous silica particles which are dense, non-agglomerated, spherical, and have an average diameter of 10 to 130 millimicrons, the silica sol having a silica:alkali metal oxide mol ratio of from 130:1 to 500:1, a relative viscosity of from 1.15 to 1.55 as measured at 10% $SiO_2$ and pH 10, and a specific conductance, as measured at 10% $SiO_2$ and 28° C., of less than $$\left(\frac{10,000}{R}+30\right)\times 10^{-5} \text{ mho/cm.}$$

where R is the silica:alkali metal oxide mole ratio.

THE WAX DISPERSIONS

The invention has application to such aqueous wax dispersions as the relatively dilute waxes of the self-polishing type, the more concentrated water-containing wax pastes, and other such compositions in which wax is dispersed in an aqueous medium.

The term "wax" as used herein will be understood to include not only the naturally occurring materials composed largely of fatty acid esters of high molecular weight monohydric alcohols, such as carnauba, candelilla, and beeswax but also other organic, water-insoluble materials which have the physical character of waxes. This is in accord with general usage in the art, as is illustrated in an article entitled "Waxes in industry—I" by A. H. Woodhead, in "Paint Manufacture," vol. 17, page 40 (1947).

"It has been the practice in recent years to include in the term 'wax' those substances which bear some physical resemblance to any of the natural waxes, including paraffins and ozokerites. This definition is more useful since the inception of a large range of synthetic products of wax-like appearance and physical behaviour, and it is due to this conception that such substances as naphthalene chlorides, polyethylenes, many higher hydrocarbons, and even glyceride esters are now termed 'waxes' and are used industrially as waxes. A wax, then, is a substance, usually complex, which is of amorphous or microcrystalline structure and usually lacking excessive 'tack' at normal temperature, and which melts fairly sharply to give a (usually) mobile liquid at a temperature but little higher than its normal melting-point. This definition largely excludes resins and the common simpler crystalloidal chemicals."

While this definition largely excludes resins it will be noted that there is a group of high molecular weight polymeric materials commonly called "synthetic waxes" which have wax-like physical properties and hence are included within the definition. It has been found that emulsions or, more properly, suspensions of such high molecular weight polymeric waxes, in combination with colloidal silica, particularly sodium-stabilized colloidal silica, provide improved water-proofing and polishing compositions in accordance with this invention.

The waxes thus fall into three general categories, namely, the ester waxes mentioned above which are usually naturally-occurring either as plant exudations or animal excreta, the hydrocarbon waxes, often referred to as mineral waxes, including montan, ozokerite, ceresin, and paraffin, microcrystalline waxes, oxidized petroleum waxes, and synthetic polymeric waxes, including condensation products of hardened castor oil or octadecanediol with boric acid, monobasic carboxylic acid esters of perhydrogenated novolac, polyethylene adipate, wax-like telomerization products prepared by methods shown in United States patent of Hansford and Joyce, No. 2,440,800, issued May 4, 1948, such as those of ethylene and dichloroacetic acid, and the corresponding ethylene telomerization products with bromacetic acid.

The naturally-occurring waxes such as carnauba, candelilla, and many of the hydrocarbon waxes are well known and characterized in the art. (See, for example, The Chemistry and Technology of Waxes, A. H. Warth, Reinhold Publishing Corp., 1947). The oxidized petroleum waxes and the microcrystalline petroleum waxes are commercial materials which are referred to by their trade names throughout the examples and the rest of the present disclosure as a matter of convenience. However, these materials are further characterized by means of the chemical and physical properties given in the tabulation below. The microcrystalline waxes are defined in the Chemistry and Technology of Waxes, at page 240, as follows: "A solid hydrocarbon mixture, of molecular weight averaging higher than paraffin wax, possessing plastic properties, separated entirely from the part of crude petroleum commonly designated as heavy lubricating and cylinder oil stocks, and having a minimum kinematic viscosity of 5.75 centistokes at 210° F. and a maximum penetration of 60 at 77° F., determined by A. S. T. M method D5-25." The oxidized hydrocarbon waxes are prepared by the controlled catalytic oxidation of hydrocarbons to produce the desired number of carboxyl, carbonyl, or ester groups as determined by measurement of such properties as the acid number, saponification number, and the like. A number of these materials are characterized in the following tabulation:

*Characterization of commercial petroleum waxes*

OXIDIZED

| Trade Name | Melting Point, °F.[1] | Saponification Number[2] | Acid Number[2] | Penetration[3] |
| --- | --- | --- | --- | --- |
| "Crown 36" | 180–185 | 85–95 | 30–35 | 8 max. |
| "Crown 23" | 180–185 | 55–65 | 20–25 | 6 max. |
| "Cardis 319" | 180–185 | 65–70 | 18–20 | 5–7 |
| "Cardis 314" | 184–189 | 45–50 | 13–15 | 4–6 |

MICROCRYSTALLINE

| Trade Name | Melting Point, °F.[1] | Saponification Number[2] | Acid Number[2] | Penetration[3] |
| --- | --- | --- | --- | --- |
| "Crown 1035" | 190–195 | 0 | 0 | 2 max. |
| "Crown 700" | 195–200 | 0 | 0 | 5 max. |
| "Mekon Y-20" | 190–195 | 0 | 0 | 3–5 |

[1] Determined by A. S. T. M. method D-127-30.
[2] Determined by the conventional method.
[3] Determined by A. S. T. M. method D-5-25.

The waxes described above when made into aqueous dispersions may be there modified and extended by the incorporation of resins. The wax dispersions, including the various wax polishing compositions conventionally used in the art, are conventionally modified in such manners. The resins may be wax-soluble or miscible, in which case they may be blended into the molten wax. Other resins may be water-dispersible, and their aqueous dispersions may be incorporated into the wax emulsions. The commonly used natural resins, such as shellac and manila gum, are well known and characterized in the art. A number of synthetic commercial materials are referred to by their trade names throughout this disclosure and the examples as a matter of convenience. These materials are characterized by means of the physical and chemical properties given in the tabulations below. Where the chemical structure of the synthetic polymeric material is known, this information is also given for a complete characterization. The proportions of these resins which may be used in the compositions of this invention and the method of incorporating them is described hereinafter:

*Characterization of commercial water dispersible resins*

| Resin | Specific Gravity[2] | Index of Refraction[2] | Melting Point, °C. | Saponification Number[2] | Acid Number[2] | Chemical Type |
| --- | --- | --- | --- | --- | --- | --- |
| Shellac[5] | | | | 110–180 | 45–65 | Natural mixture of polyhydroxy acids and their esters. |
| Manila[5] | 1.06–1.08 | 1.538–1.54 | [1] 114–128 | 160–180 | 130–150 | Natural copal type alcohol soluble resin. |
| "X597" | | | [3,9] 150–165 | | [9] 130–138 | A modified maleic type.[6] |
| "Amberol 750"[7] | 1.20 | | [1] 155–175 | | 105–115 | A fortified ammonia soluble maleic ester of rosin. |
| "Durez 15546"[8] | 1.17 | 1.542 | [4] 150±3 | | 130±3 | |

[1] Determined by ASTM method D-127-30.
[2] Determined by the conventional method at 25° C.
[3] Determined by the mercury method.
[4] Determined by the capillary tube method.
[5] Characterized in Protective+Decorative Coatings, vol. 1. J. J. Matiello, John Wiley & Sons, Inc. New York, New York, 1946.
[6] Characterized in "Resinews" vol. XV, published by U. S. Industrial Chemical Co., copyright 1947.
[7] Characterized in "Amberol 750 in Wax Emulsions," Product Bulletin, form 20R, published by Rohm & Haas Co., June 1950.
[8] Characterized as Durez 15325 ground to 20 mesh in Technical Data Bulletin of U. S. Industrial Chemical Co., dated 8-16-50.
[9] Product Specifications listed on container.

Characterization of commercial wax-soluble resins

| Resin | Specific Gravity [2] | Index of Refraction [2] | Melting Point, °C. | Saponification Number [2] | Acid Number [2] | Chemical Type | Type Chemical Formula |
|---|---|---|---|---|---|---|---|
| "Lewisol 28" [5,6,7] | 1.138 | | [3] 143 | | 36 | A maleic alkyd-modified ester of rosin. | [8] A |
| "Piccolyte S-85" [4] | 0.98–1.0 | | [1] 85 | 0–4 | 0–4 | A polyterpene predominantly beta pinene. | [9] B |
| "Durez 219" [12] | 1.085 | 1.552 | [13] 135 | | 50–60 | A terpene phenolic. | |
| "Pentalyn A" [5,7] | 1.08 | 1.544 | [3] 110 | | 14 | A pentaerythritol ester of rosin. | [10,11] C |
| "Pentalyn C" [7] | 1.09 | 1.546 | [3] 135 | | 15 | A modified pentaerythritol ester of rosin. | |

[1] Determined by A. S. T. M. method D-127-30.
[2] Determined by the conventional method at 25° C.
[3] Softening point, determined by Hercules drop method.
[4] Molecular weight averages about 650. Ash less than 0.1%. Characterized in "Piccolyte the Versatile Resin," published by Pennsylvania Industrial Chem. Corp. Copyright 1948.
[5] Characterized in supplement to "Hercules Chemist," No. 13, O. A. Pickett, published by Hercules Powder Co., copyright January 1944.
[6] Viscosity=E, Gardner-Holdt, at 25° C. on 60% solution (by weight) in toluene.
[7] Characterized in "Hercules Synthetic Resins," published by Hercules Powder Co., copyright 1947.
[8] Modern Plastics Encyclopedia. Plastics Catalogue Corp., New York, N. Y., 1950, p. 1041.
[9] Same as 8, p. 1038.
[10] Same as 8, p. 1041.
[11] "Pentalyn and Pentalyn G, esters of Pentaerythritol and Resin," published by Hercules Powder Co., form 917 3M 4-41.
[12] "Durez Protective Coating Resins in Emulsion-Paste and Liquid Waxes," published by Durez Plastics and Chemicals, Inc.
[13] Determined by capillary tube method.

CHEMICAL TYPE FORMULAE

A.

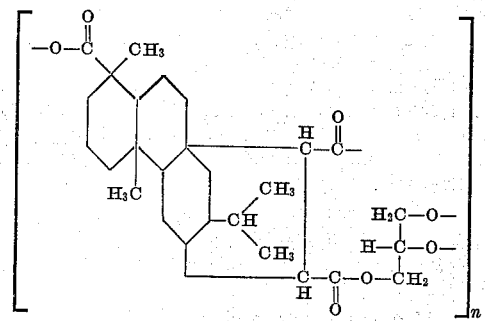

B.

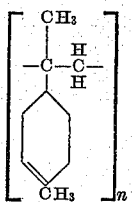

C.

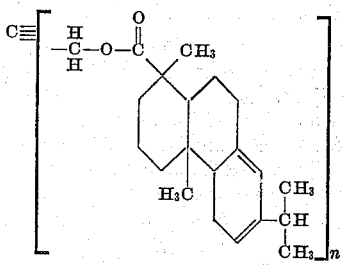

The amount of a wax used in an aqueous dispersion of this invention may be widely varied depending upon the particular use for which the composition is intended. When the composition is in paste form, as in the "rub-to-polish" type, the proportion of total solids, exclusive of silica, may be from 20 to 40% by weight of the total composition, and most of this 20 to 40% will be wax. On the other hand, in the aqueous wax dispersions of the "self-polishing" type, in which the colloidal silica is particularly effective, the proportion of total solids, exclusive of silica, may be from about 10 to 15% by weight of the total composition, and this 10 to 15% may include wax, emulsifier, and wax-soluble and water-dispersible resins.

More specifically, the wax dispersions to which colloidal silica sol is added according to this invention preferably will contain, on the basis of total solids exclusive of silica, about from 15 to 70% of wax, 0 to 25% of wax-soluble resin, 3 to 16% of emulsifier, and 0 to 80% of water-dispersible resins, all percentages being by weight. It will be evident, of course, that maximum proportions of each of these ingredients will not be simultaneously present and that the relative proportions will be selected, as shown in the specific examples, to give the particular properties desired in each instance. Liquids which are not volatile at the temperatures used in making the compositions are counted as solids, whereas volatile liquids are not included as solids.

CHARACTERIZATIONS

Wax dispersions as above described are modified according to the present invention by the addition thereto of sols of colloidal silica of a type more specifically to be described hereinafter. Before proceeding to a description of the silica sols used and the method of their application, the following description is first given of characterizations which are useful both in considering the properties of wax films obtained and in examining silica sols. The descriptions hereinafter of the silica sols and of their use will be more understandable in the light of these descriptions of characterization methods.

*Particle size measurement by the electron microscope*

The size of the silica particles and the fact as to whether or not they are non-agglomerated, that is, substantially discrete, can be directly observed if the silica is spread out in an extremely thin layer and examined with the electron microscope. Since the limit of resolution of the electron microscope is well below the 10 millimicron limit of the particles, there is no difficulty in ascertaining whether particles of the desired size are present. By examining the silhouette of the particles it is possible to measure the particle diameter in those cases where the particles are lying in such a way as to present more than a semicircle of cross section. Where less than a semicircle of cross section of a particle can be observed due to the fact that it is obscured by other particles, the particle is not measured. However, by counting and measuring a large number (several hundred) of particles which are lying in such positions as to present at least a semicircle of silhouette, the arithmetic mean particle diameter, i. e., the number average diameter, $d_n$, the surface area average diameter, $d_s$, and the particle size distribution can be determined. From the surface area average diameter, a specific surface area, $S_c$, can be calculated. This is the specific surface area which the ultimate units would have if they were non-agglomerated, discrete, dense particles, having an entirely exposed smooth surface.

In counting the particles, they are grouped according to diameter, as measured in millimicrons; each group consists of particles lying within a five millimicron range, for example, 10–15 millimicrons, 15–20 millimicrons, 20–25 millimicrons, etc. The surface area of the particles within each group is calculated from the average diameter of the group and the number of particles within the group. The total surface area of all the counted particles may then be calculated by summation of the areas in each group. The specific surface area is this total surface area, divided by the total mass of the particles counted, the latter being determined by summation, using the known density of the silica.

In carrying out this calculation, it is convenient to calculate first a "surface area average diameter," $d_s$, which would be the diameter of a spherical unit having the same specific surface area as that of the total collection of counted units.

This may be expressed mathematically, as follows:

$$d_s = \frac{\sum_{i=1}^{i=k} n_i d_i^3}{\sum_{i=1}^{i=k} n_i d_i^2}$$

where $n_i$ is the number of units in the $i$th range of sizes, the mean diameter of each being $d_i$ (e. g., $d_i = 12.5$ for the range 10–15 millimicrons), and $k$ is the number of size ranges.

The specific surface area, $S_c$, expressed as square meters per gram, may then be calculated from $d_s$, measured in millimicrons, taking the density of silica to be 2.2 grams per cc., which is the density of amorphous anhydrous, non-porous silica, $$S_c = \frac{6 \times 10^3}{\text{density} \times d_s} = \frac{2720}{d_s}$$

The arithmetic mean particle diameter is simply the number average particle diameter, $d_n$, which is determined from the formula $$\frac{\sum_{i=1}^{i=k} n_i d_i}{n}$$

where $n_i$ and $d_i$ are defined as before and $n$ is the total number of particles counted.

In determining the size of silica particles by the electron microscope, it is necessary to avoid changes such as agglomeration or coalescence of the particles which may occur in drying the sols. This is minimized by diluting the sol and allowing the water to evaporate at room temperature. The sample may be diluted to a concentration of from about 0.25 to 0.01% of $SiO_2$, but in general the maximum dilution will be used which permits retention of a sufficient number of particles in the field to permit counting of the particles as described above.

The particle counts are made from electron micrographs taken at 5,000 diameters magnification enlarged to 25,000 diameters by conventional photographic printing techniques and finally projected on a screen to a total magnification of about 250,000 diameters. Methods of mounting the samples, and counting and measuring the particles are described by J. H. L. Watson in an article entitled "Particle size determinations with electron microscopes" in Analytical Chemistry, volume 20, pages 576–584 for June 1948. The method of calculating particle size distribution is described in an article by L. R. Sperberg and H. M. Barton in "Rubber Age," volume 63, pages 45–51 for April 1948.

*Surface area determination by nitrogen adsorption*

The density of the silica particles may be determined by comparing their surface areas as calculated from electron micrographs as described above with the surface areas as determined by nitrogen adsorption. The method used for measuring specific surface areas by low temperature nitrogen adsorption is described in "A new method for measuring the surface areas of finely divided materials and for determining the size of particles" by P. H. Emmett in Symposium on New Methods for Particle Size Determination in the Sub-Sieve Range, p. 95, published by The American Society for Testing Materials, March 4, 1941. The value of 16.2 $A^2$ for the area covered by one surface adsorbed nitrogen molecule was used in calculating the specific surface areas.

When evaporating the sols to dryness for nitrogen adsorption determinations on the particles therein, the sols should be adjusted to a pH of about 3. to 4., and dried at room temperature and then at 110° C. If the sol is evaporated in the basic pH range, the specific surface area as determined by nitrogen adsorption will be significantly less than if the sol is evaporated in the acidic pH range of 3–4. This decrease in specific surface area upon evaporation in the basic region appears to be due to a coalescence of the silica particles.

If the specific surface area as determined by nitrogen adsorption is not substantially greater, for example, not more than 25% greater, than the specific surface area as calculated from electron micrographs the particles are dense and the sol is suitable for use in the process of this invention. If the silica particles are porous they will be penetrated by nitrogen and the nitrogen adsorption will be relatively high, and consequently the specific surface area by nitrogen adsorption will also be high—much higher than would be expected on the basis of the direct observation of the particles by means of the electron microscope. On the other hand, if the specific surface area by nitrogen adsorption is not substantially greater than that calculated from electron micrographs, the particles are substantially smooth, discrete, non-porous spheres. This confirms direct observations as made with the electron microscope.

*Measurement of relative viscosity*

Relative viscosity is determined as described in Bechtold and Snyder United States Patent 2,574,902, at column 6, lines 41 to 66.

*Measurement of specific conductance*

The specific conductance of the silica sols used in this invention may be determined in accordance with conventional practices, such as those described by Glasstone, Textbook of Physical Chemistry, at page 874 et seq. The specific conductance is measured at 28° C. on a sol containing 10% by weight of silica expressed as $SiO_2$.

*Measurement of turbidity and of molecular weight by light scattering*

See United States Patent 2,574,902, columns 4 to 6.

*Chemical analysis*

Standard analytical techniques are used throughout with the following limitation.

Determination of titratable alkalinity: In order to determine the $SiO_2:M_2O$ ratio, it is necessary to analyze the solution for silica and titratable alkalinity. The latter is determined by titrating the sol with HCl to a pH of 4.5 using a glass electrode pH meter.

*Determination of properties of wax dispersions*

The characteristics of modified aqueous wax dispersions containing colloidal silica sols according to the invention can be measured by examination both of the modified wax dispersions and the films cast therefrom. As indicated below, many of these tests were run in conformity with the "Specifications for Floor Wax; Water-Emulsions," No. 784a, dated March 27, 1950, superseding in turn No. 784 dated June 28, 1948, and the Proposed Revision of Specification 784, November 1949 of the General Services Administration of the Federal Government.

The temperature stability of the modified wax dispersion was determined by heating a sample of the dispersion to 52° C. for 1 week or more and observing visually any significant changes in the emulsion such as gelation, phase separation, precipitation, or the like. The low-temperature stability was determined by subjecting the modified wax dispersion to 3 freeze-thaw cycles and examining the properties for significant changes. In some cases the properties of films cast from the dispersions were measured after subjection to the high or low temperature tests and were compared with the properties of the dispersions stored at room temperature.

The conventional properties of films prepared from the modified wax dispersions were measured according to the procedures below. The films were prepared by using gauze pads soaked with the modified wax dispersion and applying two coats of the dispersion, 24 hours apart, to brown battleship linoleum.

*Leveling properties.*—The appearance of the film was examined with regard to undesirable lap marks, puddling, and highlights. The qualitative rating of E, for Excellent, was assigned to films showing no streaks or highlights; the rating G, for Good, was assigned to films exhibiting some lap marks but no puddling; the rating P, for Poor, was assigned to films showing bad puddling.

*Gloss.*—The gloss is measured by means of the Gardner laboratory 60° gloss meter as described in the above-mentioned Federal specifications, except that the films are prepared on linoleum as described above. A gloss reading above about 10 is considered good whereas a gloss reading above about 15 is considered excellent.

*Water resistance.*—This property was measured on the coated panel after the second coat had dried for twenty-four hours. One-half to one cc. of distilled water was placed on the wax film and allowed to stand for one hour after which it was removed. The spot was observed after drying. If no mark was visible the film was rated E for Excellent; if the film showed a very slight haziness while remaining glossy, it was rated G for Good; if the film remained intact but showed a white or gray spot it was rated F for Fair; if a very white spot resulted and the film had a tendency to lift it was rated P for Poor. The spots were buffed slightly with a cotton pad and observed again to further demonstrate the differences.

*Dynamic coefficient of friction.*—The slip-resistance of the wax films modified with colloidal silica is measured in terms of the dynamic coefficient of friction as described in Section 4.2.20 of the Proposed Revision of Specification 784 as listed above. The test involves the use of a Sigler pendulum-impact type slipperiness tester. This instrument was originally described in the Journal of Research of the National Bureau of Standards, volume 40, page 339, 1948, by Sigler, Geib, and Boone. The instrument readings will, of course, vary with the type of surface to which the wax dispersion is applied as well as with the constituents of the dispersion. On battleship linoleum a reading above about 0.42 is regarded as an indication of excellent slip resistance and the effect is readily perceptible upon attempting to slide the soles of one's shoes over such a surface. A reading of 0.40 to 0.42 is indicative of good slip-resistance. Readings below about 0.40 are indicative of fair to poor slip-resistance.

In addition to the tests on brown linoleum the clarity and gloss of the films are measured on black glass as described in the above-mentioned Federal specification. The leveling properties, gloss, wet abrasion resistance, and removability are also determined on black rubber tile according to the above-mentioned Federal specification No. 784a. The wet abrasion resistance is given a qualitative rating of from 0–4 according to the following scheme: No attack is rated zero; the appearance of less than 6 tiny flecks or whitened spots is rated 1; more than 6 tiny flecks but no definite film failure is rated 2; if the whitened area consists of more than 6 flecks but is less than 1 sq. in. in area the film is rated 3; if the whitened area is greater than 1 sq. in. and there is definite film failure, the film is rated 4.

THE COLLOIDAL SILICA

The term "colloidal silica" as used in describing this invention refers to silica in the form of particles of colloidal dimensions, that is, particles having an average size not exceeding about 150 millimicrons nor less than about 1 millimicron. It is particularly preferred to use colloidal silica having an average ultimate particle size less than about 30 millimicrons, that is, 0.03 microns. By "ultimate particle size" is meant the average size of particle present when the solution is diluted to about 0.1% of $SiO_2$ with water and dried in a very thin layer deposit.

The silica particles will not necessarily be present as anhydrous silicon dioxide but rather, may be in a hydrated form associated with various proportions of water. Thus, partially dehydrated silicic acid would come within the term "silica" as herein used.

In the processes and products of this invention, the colloidal silica sols used are comparatively free from impurities. A colloidal silica sol extremely low in electrolyte may be prepared by treating a silica sol containing dense, spherical, substantially non-agglomerated silica particles, such as that produced by the processes of Bechtold and Snyder United States Patent 2,574,902, dated November 13, 1951, with cation- and anion-exchangers alternately until the specific conductance as measured at 10% $SiO_2$ and 28° C. is less than $4 \times 10^{-4}$ mho/cm. To this sol there is added back enough alkali metal hydroxide to adjust the silica: alkali metal oxide mol ratio to from 130:1 to 500:1. Sols thus prepared are described and claimed in U. S. patent application of Joseph M. Rule, Serial No. 183,902 filed September 8, 1950.

Similar products may also be made by deionizing a silica sol of small particles such as that obtained by ion-exchange to attain a starting sol of a purity as above described. A portion of such a sol can then be heated to a temperature above 60° C. while further quantities of the same material are added slowly over a comparatively long period of time to effect particle growth. In doing this the alkali should be adjusted to the range above indicated so that the ratio of $SiO_2:Na_2O$ is within the range 130:1 to 500:1. Such processes are described in United States patent application of Joseph M. Rule, Serial No. 183,901, filed September 8, 1950, for "Chemical Processes."

The silica mols as thus prepared which are added to a wax emulsion according to the invention have a silica: alkali metal oxide mol ratio of from 130:1 to 500:1, a relative viscosity of from 1.15 to 1.55 as measured at 10% $SiO_2$ and pH 10, and a specific conductance, as measured at 10% $SiO_2$ and 28° C., of less than $$\left(\frac{10{,}000}{R}+30\right)\times 10^{-5}\ \text{mho/cm}.$$

where R is the silica:alkali metal oxide mole ratio, and containing amorphous silica in the form of dense, non-agglomerated, spherical particles having an average particle diameter of 10 to 130 millimicrons.

It is to be noted that sols as thus prepared can contain larer quantities of silica than can be presented in stable silica sols prepared in the presence of electrolytes. In other words, sols containing electrolytes or sols in which the particles are not dense and unagglomerated cannot practically be concentrated to $SiO_2$ contents higher than, say, 15 to 18% unless products of the type described by Bechtold and Snyder are used, in which case stable sols up to, say, 35% can be made. Sols of the type used in the present invention can be made in concentrations up to, say, about 50% $SiO_2$.

While the proportion of silica used in aqueous dispersions of the invention may vary widely depending upon the specific composition to be modified, it may be observed that it is usually preferable to use from about 10 to 50% of $SiO_2$ based upon the total solid content of the wax dispersion or emulsion to be modified. The solid content mentioned includes the wax emulsifiers, resins, and other modifying agents.

It should be observed in connection with the contents of silica in the compositions that for purposes of convenience in description it will often be noted hereinafter that a wax emulsion polishing composition contains an aqueous silica sol of the characteristics herein described. It will be understood that the sol is added to the emulsion and it therefore "contains" it in that sense. It is not to be understood that the sol is necessarily unmodified by materials which may be present in the emulsion.

MAKING THE DISPERSION

The aqueous wax dispersions of this invention may be prepared according to methods with which the art is familiar and will ordinarily contain a dispersing agent such as mono-, di-, or triethanolamine oleate or stearate, 2-amino, 2-methyl, 1-propanol, sodium or potassium soaps, morpholine oleate, or monoethylamine oleate. In the examples given below the methods of preparation referred to by Roman numerals are as follows:

Method I

This is perhaps the simplest and most easily controlled method, but its use is limited to the more easily dispersed waxes, such as carnauba, montan, candelilla, etc.

The wax to be dispersed is placed in the beaker which is immersed in the steam bath (to prevent wax caking on the sides) and melted. The oleic acid can be melted along with the wax, can be added when half the wax is melted or after all the wax is melted, but in the present use the oleic acid (or stearic acid) was added when half the wax was melted. Meanwhile on a separate hotplate the correct amount of water is brought to the boiling point. To the melted wax is added the triethanolamine (morpholine, etc.) and stirred thoroughly. To this is then added the boiling water and the mixture is vigorously stirred to form a smooth suspension of wax in water. When potassium hydroxide and/or borax are called for in the formulation they can be added to the water before pouring into the wax or in the case of the dissolved potassium hydroxide, it can be added immediately after the triethanolamine is added. In the case of the test suspensions the colloidal silica is added to the water before the latter is added to the melted wax.

Method II
(C. H. Bennett, "Commercial Waxes," pages 469 to 470)

In this method, the wax or oil is emulsified by means of a water solution of the soap which is made from triethanolamine and stearic acid (or oleic acid). The water is measured out into a container which can be heated. The triethanolamine is then added and stirred into this and then the stearic acid is added. On being heated, the acid gradually melts and can be stirred into the water to give a smooth soap solution, and the temperature is raised to just below the boiling point. The wax is now melted in a separate container and its temperature brought to 85–95° C. This is then added to the water solution and the whole solution at once stirred vigorously to obtain a good emulsion. Stirring is then continued gently until the product has cooled.

It should be noted that when the water is added to the wax care should be exercised since a great amount of foaming is produced and the wax is dispersed with almost explosive violence. In the case of the test mixtures the colloidal silica was added to the water just before it was poured into the wax.

Method III

This was a modification of Method II. The potassium hydroxide, triethanolamine, and oleic acid were added to the water which had previously been heated to 90° C. with rapid agitation. In the meantime the wax was brought to a temperature of 140–150° C. The wax was added to the aqueous solution slowly with rapid agitation. After all the wax had been added, the resulting suspension was stirred for five minutes. The suspension was then cooled for five minutes with no agitation and then the beaker was floated in a large pail of water until cooled. While cooling, the suspension was stirred occasionally to break up a thin crust which formed on the surface. When colloidal silica solution was present it was added to the water at the start of the preparation.

Method IV

This method was particularly effective for dispersing synthetic waxes. The dispersing agent and wax were placed in an aluminum beaker, melted together, and the hot melt stirred with a drink mixer. This mixture was then heated to 140–150° C. on a hot plate. In the meantime the water was brought to a temperature of 90° C. and 30% of the water was slowly added to the hot wax solution with rapid stirring. The resulting emulsion was then slowly added to the remaining water at 90° C. This procedure was adopted because it gave extremely finely divided, stable dispersions of carnauba wax which dried to continuous, lustrous films.

Method V

A. The following method is a slow inversion method applicable to aqueous wax dispersions containing modifying resins. The wax is heated to such a temperature as is necessary to obtain solution of the resins in the wax; this is about 120–150° C. The resins, usually in powdered form, are stirred into the melt until dissolved. The melt is then allowed to cool to a temperature of about 110–120° C. and the oleic acid is added. When the temperature has dropped to about 95–97° C. the morpholine is added very carefully and the mixture is stirred for 10 minutes. If ammonia is used in the formulation it is diluted to about 7%, warmed to 70–75° C. and incorporated carefully into the melt at 95° C. with good stirring. Boiling water is then added with good stirring, to the wax melt kept at 93–95° C. in order to produce an emulsion of water-in-oil. Ordinarily about 75–100 parts of the boiling water are added per 100 parts of wax plus resin to form a clear, viscous gel. More water is added gradually until the emulsion inverts to a non-viscous oil-in-water emulsion. Then more water up to a total of, say, 400 parts is added. This is followed by the addition of 150 parts of cool water (25–30° C.); the emulsion is cooled with stirring to 30° C. and diluted to the desired solids content which is usually about 12%.

The above parent wax and wax-soluble resin emulsion may be further modified by the addition of an aqueous dispersion of a modifying resin. For convenience the parent modified wax emulsion may be called "A" and the modifying aqueous resin dispersion may be called "B." The ratio of the parent wax dispersion to the modifying resin dispersion may vary from about 3.5:1 to 6.5:1 as parts by weight of dispersions of equal solids content. It is preferred to work with a solids content of about 12–14%. It is understood, of course, that for certain uses it may be desirable not to use any water dispersible modifying resin.

B. The preparation of a number of typical aqueous dispersions of modifying resins is given as follows:

MANILA LOBA C 100 parts powdered manila Loba C
36 parts 28% ammonia
Water, quantity sufficient for 12% solids.

Three hundred parts of water are heated to 60° C., and 36 parts of 28% ammonia added. To this mixture, kept at 60° C., is added, with stirring, a paste prepared from 100 parts of powdered resin and 100 parts water. When dispersion is complete (1–2 hours), the mixture is diluted to the required solids concentration and filtered to give a clear dispersion.

"AMBEROL 750"

100 parts "Amberol 750" (Rohm and Haas Co.)
25.6 parts 28% ammonia
Water, quantity sufficient for 12% solids.

One hundred parts "Amberol 750" are added to 700 parts of water with good agitation over a 5–10 minute period. The ammonia is added, the temperature is raised to 65° C., and stirring at this temperature is continued until dispersion is complete. Sufficient water is added to give the required solids concentration.

RESIN "X-597"

100 parts "X-597" resin (U. S. Industrial Chemicals, Inc.)
23 parts 28% ammonia
Water, quantity sufficient for 12% solids.

One hundred parts "X-597" resin are added to a solution of 23 parts of 28% ammonia and 300 parts of water. The mixture is stirred at room temperature until dispersion is complete (1-2 hours). It is then diluted to the desired solids content and filtered to give a clear sol.

SHELLAC 100 parts bleached, dewaxed shellac
9.6 parts 28% ammonia
Water, quantity sufficient for 12% solids.

Three hundred parts of water are heated to 60° C. and the ammonia is added. The shellac is added to the solution at 60° C., and stirred until dispersion is complete (about one-half hour). The dispersion is cooled, diluted to the required solids content, and filtered.

Alternatively, the shellac may be dispersed in the following manner:

100 parts bleached, dewaxed shellac
17 parts borax
Water, quantity sufficient for 12% solids.

Four hundred parts of water are heated to 60° C. and the borax is dissolved therein. The shellac is added to the solution at 60° C., and stirred until dispersion is complete (about one-half hour). The dispersion is cooled, diluted to the required solids content, and filtered.

It is preferred to dilute solutions A and B to the same solids content. The dispersions may then be mixed at room temperature with agitation.

C. The mixture of (A) and (B) is then further mixed with a sol of colloidal silica. Again, it is easiest to use the silica in the form of a sol having a solids content equivalent to (A) and (B). For instance, if the solids content of (A) and (B) is 12%, then the silica sol should contain 12% $SiO_2$ by weight. For convenience, this silica sol may be designated "C." The ratio of the mixture A+B to the silica sol can vary from, say 1:1 to 10:1 as parts by weight of dispersions of equal solids content. In other words, if the dispersions are at equal solids content, then $$\frac{A+B}{C} = \frac{1.0}{1} \text{ to } \frac{10}{1}$$

for most uses excellent properties are obtained with a ratio of from 1.5:1 to 3:1. More specifically, it is preferred that the ratio equal 2:1. If the dispersions are not at exactly the same solids content, then of course, the amounts of dispersions taken must be adjusted so that the ratio of the solids will be that indicated above.

DILUTE COLLOIDAL SILICA (12% $SiO_2$)

The colloidal silica sols, containing up to 50% silica, may be diluted with water for use in the wax dispersions.

Morpholine or ethyl amine may be added to improve such properties as freeze-resistance. To avoid the formation of a flocculant precipitate of silica, it is best to add about two-thirds of the required water to the concentrated sols before adding the amine, which is diluted with about one-third of the water required. The solutions are mixed thoroughly by stirring. Up to about 15% by weight of the amine based on the weight of silica in the sol may be added as disclosed in the copending United States patent application of F. J. Wolter, Serial No. 173,473, filed July 12, 1950. It may also be as little as 8% or less depending on the amount of excess amine used in preparing the wax emulsion.

*Method VI*

A resin modified wax emulsion may also be prepared by a quick inversion method. In this procedure, the wax and wax-soluble resins are melted as described in Method V, and the oleic acid, morpholine and dilute ammonia are added as also described there. The water-in-oil emulsion is then inverted rapidly to an oil-in-water emulsion by the rapid addition of 400 parts of boiling water with very vigorous agitation. Then 100 parts of cool water are stirred in, and the emulsion is cooled to 30° C. before dilution to 12% solids. The rapid inversion may also be carried out by the reverse process, i. e., by adding the molten mixture of wax, resin, soap, and a small amount of water rapidly to 600 parts of boiling water with vigorous agitation. The resulting emulsion may then be cooled and diluted as described above.

The water dispersions of modifying resins and the colloidal silica sols may be added as described under V, above.

The invention will be better understood by reference to the following illustrative examples.

*Example 1*

This is an example of an aqueous dispersion containing an ester type wax and colloidal silica, prepared according to Method I. An aqueous dispersion of wax containing colloidal silica suitable for use as a self-polishing floor wax is made up with the following components in the indicated proportions by weight:

|  | Parts by Weight | Percent by Weight of Total |
|---|---|---|
| Carnauba wax (No. 2 N. C.) | 40.0 | 13.64 |
| Triethanolamine | 4.0 | 1.36 |
| Oleic Acid | 8.0 | 2.73 |
| Potassium hydroxide (85% KOH) | 0.5 | 0.17 |
| Water | 200.0 | 76.50 |
| Colloidal Silica, 40% aqueous solution | 40.0 | 5.46 (as $SiO_2$) |

The composition may be applied as a thin coating to a linoleum floor and is found to dry to a lustrous coating without rubbing. The coating is found to be remarkably resistant to slipping when walked upon with leather soles, being in this respect outstandingly superior to a similar control coating made with a similar formulation except from which the silica is omitted.

*Example 2*

| Parent Emulsion of Wax plus Wax-Soluble Resin | | Modification of Parent Emulsion |
|---|---|---|
| Component | Parts by Weight | |
| #3 North Country Refined Carnauba | 33 | Colloidal Silica Sol used contains 43.4% $SiO_2$ deionized and stabilized with LiOH. |
| "Crown 36" | 37 | (diluted to 12% $SiO_2$) $SiO_2/Li_2O$ ratio=200. |
| "Crown 1035" | 30 | pH=7.96, 15 cc. isopropanol added per 530 cc. of the sol. |
| Morpholine | 11.0 | Water dispersible Resin Used—Shellac |
| Borax | 2.50 | Solids Weight Ratio— |
| Oleic Acid | 8.55 | Parent Emulsion:Water Dispersible Resin:Silica 50        10        30 Final emulsion good after 5 weeks at 52° C. |

RESULTS

By the tests described above under "Characterizations," films of the silica-modified emulsion on battleship linoleum had a gloss of 12, a dynamic coefficient of friction of .36, and a water-resistance of G, both before and after buffing.

Example 3

| Parent Wax Emulsion | | Modification of Parent Emulsion |
|---|---|---|
| Component | Parts by Weight | |
| #2 Yellow Carnauba | 100 | Colloidal Silica Sol Used—40% sol of the type characterized in columns 10 and 11 (diluted to 12% solids). |
| Oleic Acid | 16.9 | Water dispersible Resin Used—Manila Loba C. |
| Morpholine | 13.0 | Solids Weight Ratio— |
| 28% Ammonia | 8.3 | Parent Emulsion : Water Dispersible Resin : Colloidal Silica |
| | | 80  20  50 |
| | | Final emulsion good after 3 weeks at 52° C. and after 3 freeze-thaw cycles.[1] |
| | | Method Used for Preparing Final Emulsion—V. |

RESULTS

| Usual Properties of Film on Battleship Linoleum | | | | Other Properties of Films | | | | On Black Glass | |
|---|---|---|---|---|---|---|---|---|---|
| | | | | On Black Rubber Tile | | | | | |
| Gloss | U[2] | $H_2O$ Resistance[3] | Leveling | Gloss | Leveling | Wet Abrasion Resistance | Removability | Gloss | Gloss After 3 Freeze-Thaw Cycles |
| 16 | 0.40 | F—G | G | 49 | VG | 3.5 | 90 | 89 | 75 |

[1] Silica containing 10% morpholine based on $SiO_2$.
[2] Dynamic coefficient of friction.
[3] First rating is before buffing; second rating after buffing.

Example 4

| Parent Wax Emulsion | | Modification of Parent Emulsion |
|---|---|---|
| Component | Parts by Weight | |
| #3 North Country Refined Carnauba | 30 | Colloidal Silica Sol Used—40% sol of the type characterized in columns 10 and 11 (diluted to 12% solids). |
| "Durez 219" | 30 | Water dispersible Resin Used—Manila Loba C. |
| "Cardis 319" | 30 | Solids Weight Ratio— |
| "Mekon Y-20" | 10 | Parent Emulsion : Water Dispersible Resin : Colloidal Silica |
| Oleic Acid | 14 | 80  20  50 |
| Morpholine | 9 | Final emulsion good after 3 weeks at 52° C. and 3 freeze-thaw cycles.[1] |
| 28% Ammonia | 5 | Method Used for Preparing Final Emulsion—VI. |

RESULTS

| Usual Properties of Film on Battleship Linoleum | | | | Other Properties of Films | | | | On Black Glass | |
|---|---|---|---|---|---|---|---|---|---|
| | | | | On Black Rubber Tile | | | | | |
| Gloss | U[2] | $H_2O$ Resistance[3] | Leveling | Gloss | Leveling | Wet Abrasion Resistance | Removability | Gloss | Gloss After 3 Freeze-Thaw Cycles |
| 12 | .52 | F—G | G | 31 | E | 2.0 | 90 | 91 | 84 |

[1] Silica containing 10% morpholine based on $SiO_2$.
[2] Dynamic coefficient of friction.
[3] First rating is before buffing, second rating after buffing.

Example 5

| Parent Emulsion of Wax plus Wax Soluble Resin | | Modification of Parent Emulsion |
|---|---|---|
| Component | Parts by Weight | |
| "Cardis" 319 | 70 | Colloidal Silica Sol Used—40% sol of the type characterized in columns 10 and 11 (Diluted to 12% solids). |
| "Durez" 219 | 30 | Water Dispersible Resin Used—2 |
| Oleic Acid | 14 | Manila Loba C : Shelite No. 1694 |
| Morpholine | 10 | 1 |
| | | Solids Weight Ratio— |
| | | Parent Emulsion : Water Dispersible Resin : Colloidal Silica |
| | | 60  40  45 |
| | | Final emulsion good after 2 weeks at 52° C. |
| | | Method Used for Preparing Final Emulsion—VI. |

RESULTS

| Properties of Film on Black Rubber Tile ||
| Gloss | Leveling |
| --- | --- |
| 57–61 | VG |

Example 6

| Parent Wax Emulsion || Modification of Parent Emulsion |
| Component | Parts by Weight | |
| --- | --- | --- |
| #3 North Country Refined Carnauba | 100 | Colloidal Silica Sol Used—40% sol of the type described in Rule U. S. Appln. Ser. No. 183,902 (Diluted to 12% solids). |
| Oleic Acid | 16 | Water Dispersible Resin Used—Shellac.[1] |
| Triethanolamine | 12 | Solids Weight Ratio— |
| Ammonia | 5 | Parent Emulsion : Water Dispersible Resin : Colloidal Silica |
| | | 14                          56                          30 |
| | | Method Used for Preparing Final Emulsion—VI. |
| | | pH of Final Emulsion—7.36 |
| | | Gloss of Final Film on Black Glass—82 |

[1] Shellac dispersed with Borax.

Example 7

| Parent Wax Emulsion || Modification of Parent Emulsion |
| Component | Parts by Weight | |
| --- | --- | --- |
| #3 North Country Refined Carnauba | 100 | Colloidal Silica Sol Used—40% sol of the type described in Rule U. S. Appln. Ser. No. 183,902 (Diluted to 12% solids). |
| Oleic Acid | 16 | Water Dispersible Resin Used—Shellac [1] |
| Triethanolamine | 12 | Solids Weight Ratio— |
| Ammonia | 5 | Parent Emulsion : Water Dispersible Resin : Colloidal Silica |
| | | 14                          56                          30 |
| | | Method Used for Preparing Final Emulsion—VI. |
| | | pH of Final Emulsion—8.46. |

RESULTS

| Properties of Final Film ||||
| On Black Glass || On Black Rubber Tile ||
| Clarity | Gloss | Leveling | Gloss |
| --- | --- | --- | --- |
| E | 92 | E | 55 |

[1] Shellac dispersed with ammonia.

This application is a continuation-in-part of my United States application Serial No. 239,853, filed August 1, 1951, for "Chemical Compositions."

I claim:

1. A wax emulsion polishing composition containing from 10 to 50% of $SiO_2$, based upon the solid content of the wax emulsion, of an aqueous silica sol having a silica: alkali metal oxide mole ratio of from 130:1 to 500:1, a relative viscosity of from 1.15 to 1.55 as measured at 10% $SiO_2$ and pH 10, and a specific conductance, as measured at 10% $SiO_2$ and 28° C., of less than $$\left(\frac{10,000}{R}+30\right)\times 10^{-5} \text{ mho/cm.}$$

where R is the silica:alkali metal oxide mole ratio, and containing amorphous silica in the form of dense, non-agglomerated, spherical particles having an average particle diameter of 10 to 130 millimicrons.

2. In a process for the preparation of a wax emulsion polishing composition, the steps comprising melting a wax, adding thereto an aqueous silica sol, then emulsifying the wax in the presence of the silica sol to make a wax emulsion, the silica sol having a silica:alkali metal oxide mol ratio of from 130:1 to 500:1, a relative viscosity of from 1.15 to 1.55 as measured at 10% $SiO_2$ and pH 10, and a specific conductance, as measured at 10% $SiO_2$ and 28° C., of less than $$\left(\frac{10,000}{R}+30\right)\times 10^{-5} \text{ mho/cm.}$$

where R is the silica:alkali metal oxide mole ratio, and containing amorphous silica in the form of dense, non-agglomerated, spherical particles having an average particle diameter of 10 to 130 millimicrons.

References Cited in the file of this patent

UNITED STATES PATENTS

| 2,088,795 | Kline | Aug. 3, 1937 |
| 2,222,969 | Kistler | Nov. 26, 1940 |
| 2,577,485 | Rule | Dec. 4, 1951 |
| 2,597,871 | Iler | May 27, 1952 |